United States Patent
Lim et al.

(10) Patent No.: US 9,837,808 B2
(45) Date of Patent: Dec. 5, 2017

(54) SUPERCONDUCTING POWER SYSTEM AND INSTALLING METHOD OF SUPERCONDUCTING CABLE

(71) Applicant: LS CABLE & SYSTEM LTD., Anyang-si, Gyeonggi-do (KR)

(72) Inventors: Young Seok Lim, Incheon (KR); Yong Hee Won, Seoul (KR); Young Il Cho, Osan-si (KR); Chang Youl Choi, Ansan-si (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 47 days.

(21) Appl. No.: 15/030,306

(22) PCT Filed: Mar. 30, 2015

(86) PCT No.: PCT/KR2015/003119
§ 371 (c)(1),
(2) Date: Apr. 18, 2016

(87) PCT Pub. No.: WO2016/060343
PCT Pub. Date: Apr. 21, 2016

(65) Prior Publication Data
US 2016/0336096 A1  Nov. 17, 2016

(30) Foreign Application Priority Data

Oct. 16, 2014  (KR) .................. 10-2014-0139706

(51) Int. Cl.
*H01R 9/05*  (2006.01)
*H01B 12/00*  (2006.01)
(Continued)

(52) U.S. Cl.
CPC ............ *H02G 15/34* (2013.01); *Y02E 40/648* (2013.01)

(58) Field of Classification Search
CPC .............................. H02G 15/34; Y02E 40/648
(Continued)

(56) References Cited

U.S. PATENT DOCUMENTS

2006/0211579 A1* 9/2006 Yamaguchi ............ H01B 12/14
505/230
2010/0285968 A1  11/2010 Gregory
(Continued)

FOREIGN PATENT DOCUMENTS

JP  2000-331547 A  11/2000
JP  2006-094640 A  4/2006
(Continued)

OTHER PUBLICATIONS

International Search Report for PCT/KR2015/003119 dated Jun. 26, 2015 from Korean Intellectual Property Office.

*Primary Examiner* — Sherman Ng
(74) *Attorney, Agent, or Firm* — Paratus Law Group, PLLC (57) ABSTRACT

The present invention relates to a superconducting power system which is capable of effectively absorbing an axial force caused by the contraction of a superconducting cable when the superconducting cable is cooled and in which the superconducting cable is installed in the form of minimizing unnecessary waste of an installation space, and a method of installing a superconducting cable.

15 Claims, 6 Drawing Sheets

(51) Int. Cl.
*H01L 39/24* (2006.01)
*H02G 15/34* (2006.01)

(58) Field of Classification Search
USPC .............................. 174/15.5, 74 R; 505/230
See application file for complete search history.

(56) References Cited

U.S. PATENT DOCUMENTS

| | | | |
|---|---|---|---|
| 2012/0214672 A1* | 8/2012 | Choi ..................... | H02G 15/34 505/163 |
| 2013/0157867 A1* | 6/2013 | Yagi ........................ | H01R 4/68 505/430 |
| 2013/0165326 A1* | 6/2013 | Yagi ...................... | H02G 15/34 505/230 |

FOREIGN PATENT DOCUMENTS

| | | |
|---|---|---|
| KR | 10-2010-0120262 A | 11/2010 |
| KR | 10-2014-0115169 A | 9/2014 |
| WO | WO 2012-108427 A1 | 8/2012 |

\* cited by examiner

SUPERCONDUCTING POWER SYSTEM AND INSTALLING METHOD OF SUPERCONDUCTING CABLE

CROSS REFERENCE TO PRIOR APPLICATION

This application is a National Stage Patent Application of PCT International Patent Application No. PCT/KR2015/003119 (filed on Mar. 30, 2015) under 35 U.S.C. §371, which claims priority to Korean Patent Application No. 10-2014-0139706 (filed on Oct. 16, 2014), which are all hereby incorporated by reference in their entirety.

BACKGROUND

1. Field

The present invention relates to a superconducting power system and a superconducting cable installation method. More particularly, the present invention relates to a superconducting power system which is capable of effectively absorbing an axial force caused by the contraction of a superconducting cable when the superconducting cable is cooled and in which the superconducting cable is installed in the form of minimizing unnecessary waste of an installation space, and a method of installing a superconducting cable.

2. Description of the Related Art

A superconducting wire has an electrical resistance approaching '0' at a certain temperature and may thus have high current transfer capability even at a low voltage.

In the case of an alternating current (AC) superconducting cable which is a power cable having high-capacity, high efficiency, and eco-friendly power transmission capability, a ratio of a charging current to an allowable current is small. Thus, the AC superconducting cable is less restricted in terms of a distance of power transmission using the charging current than existing cables. Thus, the AC superconducting cable is advantageous in terms of long-distance power transmission. In particular, a direct current (DC) superconducting cable has an electrical resistance approximating '0' and thus does not exhibit a voltage drop during long-distance power transmission.

For a superconducting cable including the superconducting wire, a cooling method performed using refrigerant such as nitrogen to form and maintain an extremely low temperature environment and/or an insulating method of forming a vacuum layer is employed. Since the superconducting cable is maintained at extremely low temperature using refrigerant, an intermediate joint box may be installed in an installation section at predetermined intervals and a terminal joint box may be provided to be connected to a power system in a normal-temperature environment.

In general, a superconducting cable of a superconducting power system includes an inner metallic conduit and an outer metallic conduit.

A cooling unit in which liquid refrigerant circulates may be provided at an inner side of the inner metallic conduit of the superconducting cable, and a multi-layer insulation (MLI) type insulating layer may be provided outside the inner metallic conduit to prevent the transfer of heat through radiation or the like.

For vacuum-insulation, a vacuum unit having a space with spacers may be provided at an outer side of the insulating layer. The outer metallic conduit may be located at an outer side of the vacuum unit.

The inner metallic conduit and the outer metallic conduit may be each formed of a metal material, e.g., an aluminum material.

In general, a wire of an ultra-high voltage cable expands by heat generated by a conductor during transfer of electrical current. Thus, in a cable duct, distortion may occur and a force may be concentrated onto a fixed portion thereof. Therefore, methods of installing a cable using a technique of cable-laying design have been developed under various environmental conditions. Ultra high voltage cables have been developed for a long time and thus techniques of cable-laying design have also been accumulated.

However, the superconducting cable may contract due to use of liquid nitrogen which is extremely low temperature refrigerant, unlike conventional ultra high voltage cables. In particular, since the inner metallic conduit accommodates liquid refrigerant, contraction may occur to a serious extent due to extremely low-temperature liquid refrigerant circulating in the cooling unit.

In contrast, the transfer of heat to the outer metallic conduit through radiation, convection, conduction, or the like is blocked by an insulating unit and a vacuum unit. Thus, a degree to which the outer metallic conduit contracts due to the liquid refrigerant is not high.

Thus, the inner metallic conduit and the outer metallic conduit, which are provided to maintain the hardness, etc. of the superconducting cable, contract to different extents when the liquid refrigerant is filled or circulates therein.

Each of the inner metallic conduit and the outer metallic conduit has a corrugated structure. Thus, when the inner metallic conduit contracts, the whole superconducting cable contracts. A contractile force of the contracting superconducting cable may be applied to each intermediate joint box or the terminal joint box.

When the contractile force is applied to each joint box due to the contraction of the superconducting cable, a problem or an accident related to connection to each joint box may occur. To solve this problem or accident, in the related art, each intermediate joint box or the terminal joint box may be configured to be slidable within a predetermined range in a direction parallel to a contractile force applied thereto rather than being configured to be fixed devices. Otherwise, a horizontal detour space or a horizontal offset space may be formed in a superconducting cable laying area to set a section through which the superconducting cable may detour to a large extent in a horizontal direction through this space, thereby preventing problems caused by the contraction of the superconducting cable.

However, the system stability may be lowered when each joint box is installed to be slidable. A superconducting cable laying area in a superconducting cable laying section may unnecessarily increase and an axial force may not decrease to a sufficient extent due an internal frictional force when the offset space is formed.

In particular, when the superconducting cable is installed in the earth, a sufficient offset space is not easy to secure and interference may occur with other cables installed together with the superconducting cable in a cable-laying space.

SUMMARY

In accordance with an aspect of the present invention, the above and other objects can be accomplished by the provision of a superconducting power system comprising a superconducting cable including a former at a center thereof, an inner metallic conduit at an outer side of a cooling channel, and an outer metallic conduit having a vacuum unit at an inner side thereof; a first connection device connected to one end of the superconducting cable; and a second connection device connected to another end of the superconducting cable, wherein at least one suspension section is provided, in which the superconducting cable connecting the first and second connection devices is suspended downward.

At least one suspension section may have a form of a one-period section connecting adjacent highest points among a sine function and a cosine function.

A suspension length corresponding to a period of each of the at least one suspension section and a suspension height corresponding to a maximum defection of the superconducting cable in each of the at least one suspension section may satisfy a range of 16.0<suspension length/suspension height<27.5.

The suspension height and a diameter of the superconducting cable may satisfy a range of 1.0<suspension height/diameter<2.0.

The suspension length and a diameter of the superconducting cable may satisfy a range of 30<suspension length/diameter<40.

The superconducting power system may comprise at least two support members provided at locations spaced apart from each other to support the superconducting cable so as to form the at least one suspension section.

The superconducting power system may comprise (N+1) support members such that N suspension sections are consecutively disposed adjacent to each other, where N denotes a natural number which is greater than and equal to 2.

A suspension section having a longer suspension length may be greater in height than a suspension section having a shorter suspension length among the N suspension sections.

The first or second connection device may be configured to be a fixed device.

The superconducting cable may be disposed in a horizontal straight line to form a horizontal section from each of the first and second connection device to a support member adjacent thereto.

And In accordance with an aspect of the present invention, the above and other objects can be accomplished by the provision of a method of installing a superconducting cable by connecting the superconducting cable to two fixed connection devices, the superconducting cable including a core unit having a former formed of a copper material and a superconducting conductor layer at a center thereof, an inner metallic conduit having a cooling unit for cooling the core unit at an inner side thereof, and an outer metallic conduit accommodating an insulating unit and a vacuum unit outside the inner metallic conduit, the method comprising experimentally installing the superconducting cable in the form of a periodic function such that a plurality of suspension sections in which the superconducting cable is suspended downward are disposed adjacent to each other, the plurality of suspension sections having the same suspension length and the same suspension height, measuring axial forces of the former, the inner metallic conduit, and the outer metallic conduit due to expansion or contraction thereof in a lengthwise direction of the superconducting cable, which is installed in the experimentally installing of the superconducting cable, when the superconducting cable is cooled, determining installation conditions for installing the superconducting cable, taking into account the sum of the axial forces of the former, the inner metallic conduit, and the outer metallic conduit measured in the measuring of the axial forces, wherein the installation conditions comprise a suspension length corresponding to the distance between the plurality of suspension sections in a horizontal direction and a suspension height of the plurality of suspension sections and installing the superconducting cable according to the installation conditions determined in the determining of the installation conditions.

The determining of the installation conditions may be performed by comparing the sum of the axial forces of the former, the inner metallic conduit, and the outer metallic conduit measured in the measuring of the axial forces and a length of the superconducting cable to be installed with a maximum allowable axial force and cost conditions, such that the suspension length and the suspension height satisfy a range of 16<suspension length/suspension height<27.5.

The determining of the installation conditions may be performed such that a relation between the suspension length corresponding to a period of each of the plurality of suspension sections and a diameter of the superconducting cable satisfies a range of 30<suspension length/diameter<40.

The determining of the installation conditions may be performed such that a relation between the suspension height and a diameter of the superconducting cable satisfies a range of 1.0<suspension height/diameter<2.0.

The determining of the installation conditions may comprise determining a plurality of allowable installation conditions.

The experimentally installing of the semiconducting cable and the measuring of the axial forces may be repeatedly performed a plurality of times while changing the suspension length and height of the experimentally installed superconducting cable.

The experimentally installing of the superconducting cable and the measuring of the axial forces may be performed according to a computer simulation method.

DETAILED DESCRIPTION

Hereinafter, various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The same reference numerals represent the same elements throughout the drawings.

Figure 1:
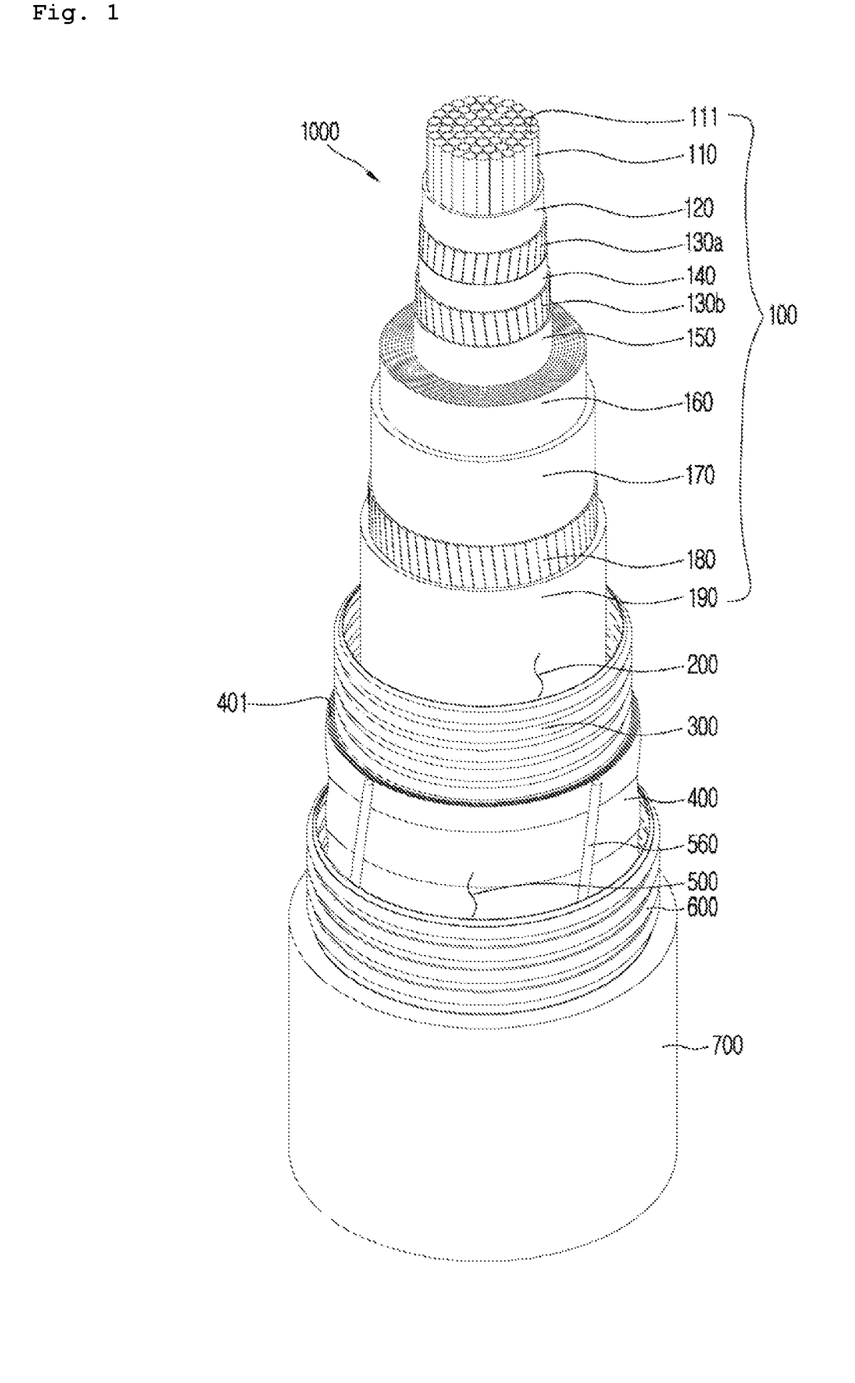
FIG. 1 is an exploded perspective view of a superconducting cable according to an embodiment of the present invention.
Figure 2:
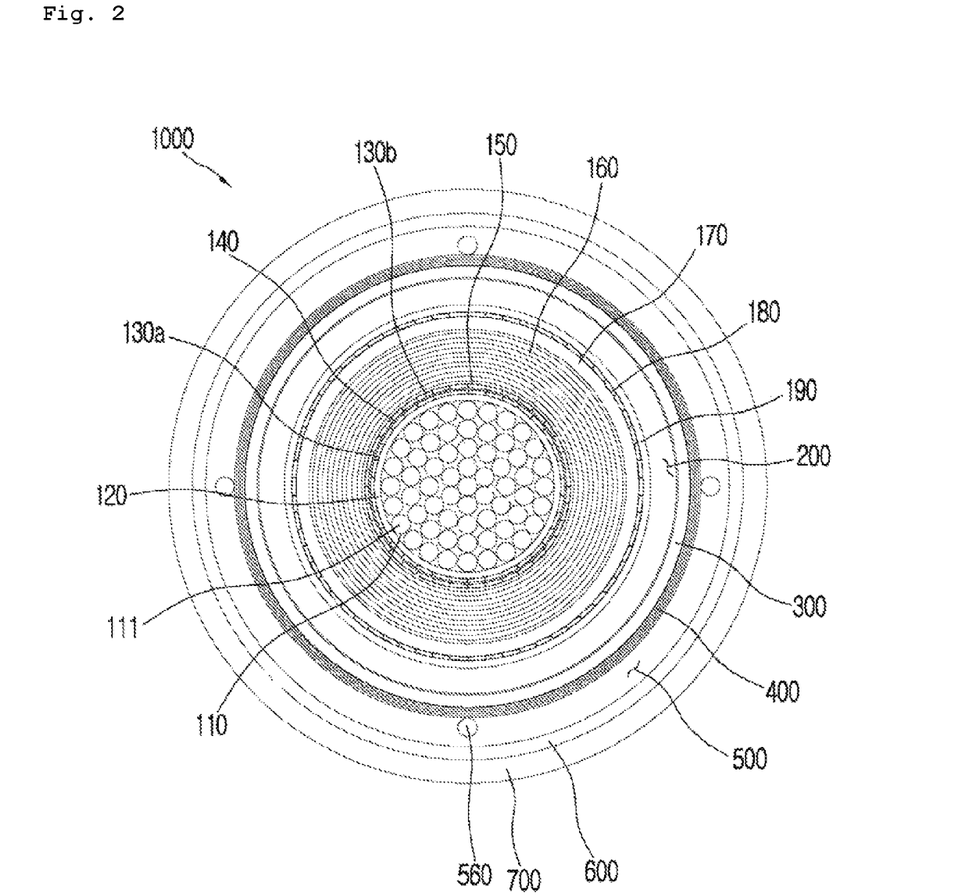
FIG. 2 is a cross-sectional view of the superconducting cable of FIG. 1.

FIG. 1 is an exploded perspective view of a superconducting cable 1000 according to an embodiment of the present invention. FIG. 2 is a cross-sectional view of the superconducting cable 1000 of FIG. 1.

A basic structure of the superconducting cable 1000 according to an embodiment of the present invention will be described below.

The superconducting cable 1000 may include a core unit 100, a cooling unit 200, an inner metallic conduit 300, an insulating unit 400, a vacuum unit 500, an outer metallic conduit 600, and a sheath unit 700. The core unit 100 includes a former 110, at least one superconducting conductor layer 130 having a plurality of superconducting wires located in a line in a lengthwise direction of the former 110 to cover an outer surface of the former 110, an insulating layer 140 covering the at least one superconducting conductor layer 130, and at least one superconducting shielding layer 180 having a plurality of superconducting wires located in a line in the lengthwise direction of the former 100 to cover an external surface of the insulating layer 140 located in a line. The cooling unit 200 is located at an outer side of the core unit 100 to cool the core unit 100, and includes a refrigerant channel of liquid refrigerant for cooling the core unit 100. The inner metallic conduit 300 is located at an outer side of the cooling unit 200. The insulating unit 400 is located at an external side of the inner metallic conduit 300, and forms an insulating layer wound by an insulator 401 in multiple layers. The vacuum unit 500 includes a plurality of spacers 560 at locations spaced apart from each other outside the insulating unit 400 to vacuum-insulate the cooling unit 200. The outer metallic conduit 600 is located at an outer side of the vacuum unit 500. The sheath unit 700 is located at an outer side of the outer metallic conduit 600 to form a sheath layer.

The elements of the superconducting cable 1000 will be sequentially described below. The former 110 may provide a place through which long flat superconducting wires is wound around the former 110, function as a frame forming a shape, and may be also a path through which fault current flows. The former 110 may have a round shape to which copper (Cu) wires 111 each having a round cross-section are compressed.

In detail, basically, the former 110 has a cylindrical shape and may thus serve as a frame in which the long flat superconducting wires are put. A diameter of the former 110 is determined taking into account the width of the superconducting wires, such that the superconducting wires do not come off and have a shape very similar to a round shape when they are put in the former 110.

As illustrated in FIGS. 1 and 2, the former 110 may have a densely packed center. Alternatively, the former 110 may have a hollow cylindrical shape so that it may serve as not only a frame in which the superconducting wires are put but also a path in which refrigerant moves. Each of the wires 111 constituting the former 110 may be formed of copper (Cu) or the like. The wires 111 may be connected in parallel to the superconducting wires to form an earth return conductor when fault current occurs in a power system.

A cross-sectional area of conductors, e.g. copper, of the wires 111 may be determined according to the amount of the fault current. When the fault current is a high-voltage current, a stranded wire may be obtained by compressing the wires 111 to a round shape.

It is inevitable that the former 110 has the dimple surface because the stranded wire is obtained by compressing, to the round shape, the wires 111 each having the round cross-section of the former 110. Thus, an external surface of the former 110 may be covered with a planarization layer 120 to planarize the dimple surface of the former 110. A material of the planarization layer 120 may be, for example, semiconducting carbon paper, brass tape, or the like.

Although not shown, a cushion layer may be located between the planarization layer 120 and the at least one superconducting conductor layer 130. The cushion layer may be provided using semiconducting carbon paper tape to protect the at least one superconducting conductor layer 130.

The at least one superconducting conductor layer 130 formed of a superconducting wire may be provided at an outer side of the planarization layer 120. The superconducting wire of the at least one superconducting conductor layer 130 according to an embodiment of the present invention may be a second-generation (2G) superconducting wire.

A phenomenon that an electric resistance is '0' at specific temperature or less is referred to as superconductivity. A phenomenon that superconductivity occurs at temperature which is not absolute zero (−273° C.) and is higher than absolute temperature, e.g., about 100 K (−173° C.), is referred to as high-temperature superconductivity. The first-generation (1G) wire employing a high-temperature superconductor and containing a bismuth strontium calcium copper oxide (BSCCO) as a main ingredient and the coated conductor (CC) type 2G wire containing a yttrium barium copper oxide (YBCO) or a rare-earth barium copper oxide (ReBCO) as a main ingredient have been introduced as superconducting wires employed in the field of power cable.

Since silver (Ag) is used as a base metal of the 1G superconducting wire, the price of the 1G superconducting wire is difficult to decrease. The 2G superconducting wire is better than the 1G superconducting wire in terms of AC loss characteristics. The 1G superconducting wire has a filament structure, whereas the 2G superconducting wire has a layered structure and is thus more efficient than the 1G superconducting wire in terms of hysteress loss.

The 2G superconducting wire may include a metal substrate, a buffer unit, a superconducting unit, a protection unit, and the like. The metal substrate may serve as a base unit of the 2G superconducting wire, maintain the mechanical strength of the 2G superconducting wire, and be formed of a hastelloy, nickel-tungsten (Ni—W), or the like. The buffer unit may serve as a buffer for depositing a superconducting layer on the metal substrate. The superconducting unit serves as a current conducting path. A material of the protection unit may include a silver (Ag)/copper (Cu) alloy layer. The silver (Ag) alloy layer is present between the superconducting layer and the copper (Cu) alloy layer and may enable layer deposition. The copper (Cu) alloy layer may strengthen the mechanical strength of the 2G superconducting wire. The thicknesses and materials of the silver (Ag) alloy layer and the copper (Cu) alloy layer may be different according to application thereof.

A first superconducting conductor layer 130a formed of the 2G superconducting wire and surrounded by the plurality of superconducting wires 131 may be located at an outer side of the former 110 planarized by the planarization layer 120. The first superconducting conductor layer 130a may be formed by surrounding the planarization layer 120 by the plurality of superconducting wires in parallel with each other.

Furthermore, as illustrated in FIG. 1, the at least one superconducting conductor layer 130 may be configured in a multi-layer structure according to the amount of current to be transmitted or supplied via the superconducting cable 1000.

In the embodiment of FIG. 1, a total of two superconducting conductor layers 130a and 130b are provided. When superconducting conductor layers are simply stacked together, a current capacity does not increase due to a skin effect of current. When superconducting conductor layers are stacked in a multilayer structure to solve this problem, the insulating layer 140 may be provided between the superconducting conductor layers 130a and 130b. The insulating layer 140 may be in an insulating tape form, and may be provided between the superconducting conductor layers 130a and 130b stacked together to insulate them with each other, thereby preventing the skin effect from occurring due to the stacked superconducting conductor layers 130a and 130b. The insulating layer 140 may cause directions in which current flows through the superconducting conductor layers 130a and 130b stacked in the multilayer structure to be the same.

Although a case in which the at least one superconducting conductor layer 130 has a two-layer structure including the first and second superconducting conductor layers 130a and 130b is illustrated in the embodiment of FIG. 1, the at least one superconducting conductor layer 130 may include more than two superconducting conductor layers if needed.

A superconducting wire constituting each of the superconducting conductor layers 130a and 130b may be connected in parallel to the wires 111 of the former 110, so that current flowing through the superconducting wires may flow through the wires 111 of the former 110 when an accident, such as a failure of superconducting conditions, occurs. Thus the superconducting wires may be prevented from being heated or damaged due to an increase in a resistance thereof when the superconducting conditions are not satisfied.

An inner semiconducting layer 150 may be provided at an external surface of the second superconducting conductor layer 130b at the outer side of the first superconducting conductor layer 130a. The inner semiconducting layer 150 may be provided to alleviate the concentration of an electric field in each region of the at least one superconducting conductor layer 130 and achieve a uniform electric surface field. In detail, the inner semiconducting layer 150 may be provided to alleviate the concentration of an electric field at corners of the superconducting wires and achieve a uniform electric field distribution. Similarly, the outer semiconducting layer 170 to be described below may be provided. The inner semiconducting layer 150 may be provided by winding a semiconducting tape.

An insulating layer 160 may be provided at an outer side of the inner semiconducting layer 150. The insulating layer 160 may increase the dielectric strength of the superconducting cable 1000. In general, in order to insulate a high-voltage cable, a cross linking-polyethylene (XLPE) cable or an oil-filled cable is used. The superconducting cable 1000 is cooled to extremely low temperature to achieve a superconductive property of the superconducting wires. However, the XLPE cable may be broken at the extremely low temperature and thus an insulation property thereof may be damaged. The oil-filled cable may cause an environmental problem to occur at the extremely low temperature. In contrast, in the superconducting cable 1000 according to an embodiment of the present invention, insulating paper which is general paper may be used as the insulating layer 160. The insulating layer 160 may be formed by winding the insulating paper a plurality of times.

In general, kraft paper or polypropylene laminated paper (PPLP) is used as the insulating paper. In the case of the superconducting cable 1000, PPLP insulating paper is used among various insulating paper materials, taking into account easy winding property and dielectric strength characteristics.

The outer semiconducting layer 170 may be provided at an external surface of the insulating layer 160. Similarly, the outer semiconducting layer 170 may be provided to lessen the concentration of an electric field in each region of the at least one superconducting conductor layer 130 and achieve a uniform surface electric field. The outer semiconducting layer 170 may be also formed by winding semiconducting tape.

The at least one superconducting shielding layer 180 may be provided at an outer side of the outer semiconducting layer 170. The at least one superconducting shielding layer 180 may be formed in a manner similar to the manner of forming the at least one superconducting conductor layer 130. When a surface of the outer semiconducting layer 170 is not smooth, a planarization layer (not shown) may be provided thereon if needed. Superconducting wires may be disposed in parallel on an external surface of the planarization layer in a circumferential direction of the planarization layer to form the at least one superconducting shielding layer 180.

The at least one superconducting shielding layer 180 formed of 2G superconducting wires may be designed such that the amount of current conducted therethrough is about 95% of the amount of current flowing through the at least one superconducting conductor layer 130, thereby minimizing a stray magnetic field.

A core cladding layer 190 forming an exterior of the core unit 100 may be provided at an outer side of the at least one superconducting shielding layer 180. The core cladding layer 190 may include various tapes or binders. The core cladding layer 190 may serve as the exterior of the core unit 100 to be exposed via a cooling layer to be described below, and bind all the elements of the core unit 100. The core cladding layer 190 may be formed of a metal tape such as a SUS material.

The core unit 100 of the superconducting cable 1000 may be formed as described above. Although FIGS. 1 and 2 illustrates that each of the above planarization layer and semiconducting layers is a single layer formed of the same material, various additional layers may be added thereto if needed.

The cooling unit 200 may be provided at an outer side of the core unit 100. The cooling unit 200 may be provided to cool the superconducting wires of the core unit 100, and include, at an inner side thereof, a cooling channel in which liquid refrigerant circulates. Liquid nitrogen may be used as the liquid refrigerant. The liquid refrigerant (liquid nitrogen) may be cooled to about −200° C., and circulate in the cooling channel to maintain the superconducting wires of the core unit 100 in the cooling unit 200 at extremely low temperature which is a superconducting condition.

The liquid refrigerant may flow in the cooling channel of the cooling unit 200 in one direction, be collected by a joint box or the like of the superconducting cable 1000 to be cooled again, and be then supplied again to the cooling channel of the cooling unit 200.

The inner metallic conduit 300 may be provided at the outer side of the cooling unit 200. The inner metallic conduit 300 serves as the exterior of the superconducting cable 1000 together with the outer metallic conduit 600 to be described below to protect the core unit 100 from being mechanically damaged during the installing or operating of the superconducting cable 1000. The superconducting cable 1000 is wound on a drum to be easily manufactured and carried, and is unwound from the drum to install. Thus, bending stress or tensile stress may be continuously applied to the superconducting cable 1000.

The inner metallic conduit 300 may be provided to maintain the original performance of the superconducting cable 1000 even in a state in which the mechanical stress is applied to the superconducting cable 1000. Thus, the inner metallic conduit 300 has a corrugated structure including protuberances and indents in a lengthwise direction of the superconducting cable 1000 to strengthen the hardness of the superconducting cable 1000 against the mechanical stress. The inner metallic conduit 300 may be formed of aluminum, SUS, or the like.

Since the inner metallic conduit 300 includes a cooling channel in which liquid refrigerant flows, the inner metallic conduit 300 formed of a metal material is cooled and contracts according to an expansion/contraction ratio depending on temperature when cooling of the superconducting cable 1000 starts.

As the superconducting cable 1000 is cooled, not only the inner metallic conduit 300 but also the former 100 at the center of the superconducting cable 1000 may contract to an extremely large extent.

Such contraction occurs in the lengthwise direction of the superconducting cable 1000, and thus an axial force is applied to a terminal or intermediate connection device of a superconducting power system according to an embodiment of the present invention.

The axial force applied to the terminal or intermediate connection device may be understood as the sum of axial forces respectively applied to the former 110, the inner metallic conduit 300, and the outer metallic conduit 600.

Although contraction may occur in the superconducting wire constituting the at least one superconducting conductor layer 130 or the at least one superconducting shielding layer 180, the ratio of the volume/weight of the superconducting wire thereof to that of the whole superconducting cable 1000 is negligible, as will be described below in relation to a method of installing a superconducting cable according to an embodiment of the present invention.

The inner metallic conduit 300 is located at the outer side of the cooling unit 200 and may thus have extremely low temperature corresponding to the temperature of the liquid refrigerant. Thus, the inner metallic conduit 300 may be classified as a low-temperature metallic conduit.

The insulating unit 400 including the insulating layer wound in multiple layers by the insulator 401 in which a metal film having high reflectance is coated with a polymer having low heat conductivity may be provided on an outer circumferential surface of the inner metallic conduit 300. The insulating unit 400 is needed to form multi-layer insulation (MLI), and particularly, to block exchange of heat through radiation at the insulating unit 400 as a boundary.

The vacuum unit 500 may be provided at an outer side of the insulating unit 400. The vacuum unit 500 is needed to prevent heat exchange or invasion through conduction or convection.

The vacuum unit 500 may be obtained by forming a space in an outer side of the insulating unit 400 and changing the space to a vacuum state.

The vacuum unit 500 may be a space preventing invasion of heat to the core unit 100 from the outside of normal temperature through convection or the like, and include at least one spacer 560 to form a physically separated space. The at least one spacer 560 may be provided in the space to prevent the outer metallic conduit 600 at an outer side of the space in the vacuum unit 500 and the insulating unit 400 at an inner side of the vacuum unit 500 from being in contact with each other in all regions of the superconducting cable 100.

The at least one spacer 560 may be provided in the lengthwise direction of the superconducting cable 1000, and be wound in a spiral form on an external side of the core unit 100 and particularly the insulating unit 400.

As illustrated in FIG. 1, a plurality of spacers 560 may be provided. The number of the spacers 560 may be increased or decreased according to the type or size of the superconducting cable 1000. The superconducting cable 1000 according to an embodiment of the present invention may include three to five spacers 560.

A material of the at least one spacer 560 may be polyethylene (e.g., FEP, PFA, ETFE, PVC, P.E, or PTFE).

Alternatively, the at least one spacer 560 may be formed of poly tetra fluoro ethylene (PTFE) or formed by coating a surface of general resin or polyethylene with PTFE or the like if needed. In this case, the PTFE may be Teflon.

Teflon is a type of fluororesin which is a very stable compound obtained through a strong chemical bond between fluorine and carbon. Thus, Teflon has features such as an almost perfect chemical inert property, a heat-resisting property, a non-adherent property, high insulating stability, a low friction coefficient, etc. Since Teflon has flexibility to a certain extent, it may be wound in the lengthwise direction of the superconducting cable 1000 while covering the insulating unit 400 in a spiral form. Since Teflon has hardness to a certain extent, it may be used as means for preventing the insulating unit 400 and the outer metallic conduit 600 from being in contact with each other to physically maintain the space of the vacuum unit 500. The at least one spacer 560 may have a diameter of 4 to 8 mm.

The outer metallic conduit 600 may be located at the outer side of the vacuum unit 500 having the at least one spacer 560. The outer metallic conduit 600 may have the same shape and material as the inner metallic conduit 300, and have a greater diameter than that of the inner metallic conduit 300 to form the space through the at least one spacer 560.

Although the outer metallic conduit 600 may have the same shape and material as the inner metallic conduit 300, the transfer of heat to the outer metallic conduit 600 through radiation, conduction, convection, or the like is blocked by the insulating unit 400 and the vacuum unit 500 when the superconducting cable 1000 is cooled through the circulation of refrigerant in the cooling unit 200. Thus, the outer metallic conduit 600 does not contract unlike the inner metallic conduit 300.

Thus, since the outer metallic conduit 600 is not greatly influenced by the cooling of the superconducting cable 1000, an axial force applied to a terminal or intermediate connection device of a superconducting power system according to an embodiment of the present invention is not influenced to a large extent by an axial force of the outer metallic conduit 600.

The sheath unit 700 serving as a cover protecting the inside of the superconducting cable 1000 may be provided at an outer side of the outer metallic conduit 600. The sheath unit 700 may be formed of a sheath material of a sheath unit of a general power cable. The sheath material of the sheath unit 700 may be polyethylene (PE), polyvinyl chloride (PVC), or the like.

FIG. 2 illustrates that the vacuum unit 500 includes three or four spacers 560 to cover the insulating unit 500 outside the inner metallic conduit 300.

Figure 3:
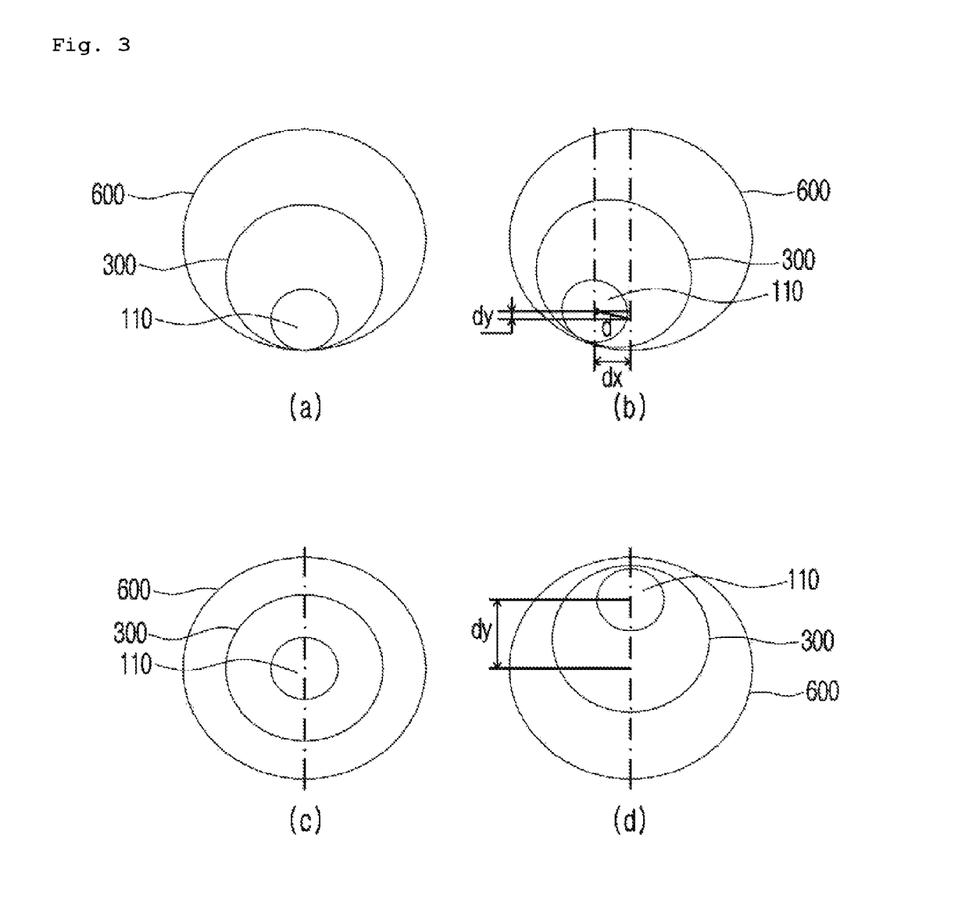
FIG. 3 is a conceptual diagram illustrating a method of installing a superconducting cable to manufacture a superconducting power system, according to an embodiment of the present invention.

FIG. 3 is a conceptual diagram illustrating a method of installing a superconducting cable to manufacture a superconducting power system 1, according to an embodiment of the present invention.

FIG. 3(*a*) illustrates states of a former 110, an inner metallic conduit 300, and an outer metallic conduit 600 before a superconducting cable is cooled, in a state in the superconducting cable is installed to form an offset section while being bent on a horizontal plane in a horizontal direction. FIG. 3(*b*) illustrates the shapes of cross-sections of the former 110, the inner metallic conduit 300, and the outer metallic conduit 600 which contract in the offset section when the superconducting cable of FIG. 3(*a*) is cooled.

FIG. 3(*c*) illustrates states of the former 110, the inner metallic conduit 300, and the outer metallic conduit 600 in a suspension section in which the superconducting cable is bent in a vertical direction, before the superconducting cable is cooled. FIG. 3(*d*) illustrates the shapes of cross-sections of the former 110, the inner metallic conduit 300, and the outer metallic conduit 600 which contract in the suspension section when the superconducting cable of FIG. 3(*c*) is cooled.

As illustrated in FIGS. 3(*a*) and (*b*), when the superconducting cable is cooled, the former 110 and the inner metallic conduit 300 contract to a larger extent and thus the center of the former 110 is displaced by a diagonal length d according to distances dx and dy. After the displacement of the center of the former 110, an axial force may be generated mainly in the former 110 and the inner metallic conduit 300, and absorbed to be proportional to a displacement corresponding to the diagonal length d. However, when in the case of a curved structure, e.g., a horizontal offset section, illustrated in FIG. 3(*b*), a high frictional force may be generated among the former 110, the inner metallic conduit 300, and the outer metallic conduit 600 due to the self-load thereof, thereby decreasing the diagonal length d.

When the superconducting cable is bent in the vertical direction as illustrated in FIGS. 3(*c*) and (*d*), a displacement dy is greater than the diagonal length d, compared to that illustrated in FIG. 3(*b*). Thus, an axial force may be absorbed to be proportional to the displacement dy (dy>d).

Experimentally, the superconducting power system 1 according to an embodiment of the present invention has the suspension section in which the superconducting cable is suspended downward in the form of a sine or cosine function among trigonometrical functions without forming a horizontal offset during the installation of the superconducting cable 1000. Thus, when the superconducting cable is cooled, an axial force generated due to contraction of the former 110, the inner metallic conduit 300, and the outer metallic conduit 600 may be absorbed by the displacement of the former 110, the inner metallic conduit 300, and the outer metallic conduit 600, thereby decreasing a finally generated axial force to a greater extent than when the superconducting cable is installed in a straight line.

A method of installing the superconducting cable of the superconducting power system 1 according to an embodiment of the present invention will be described with reference to FIGS. 4 and 5 below.

Figure 4:
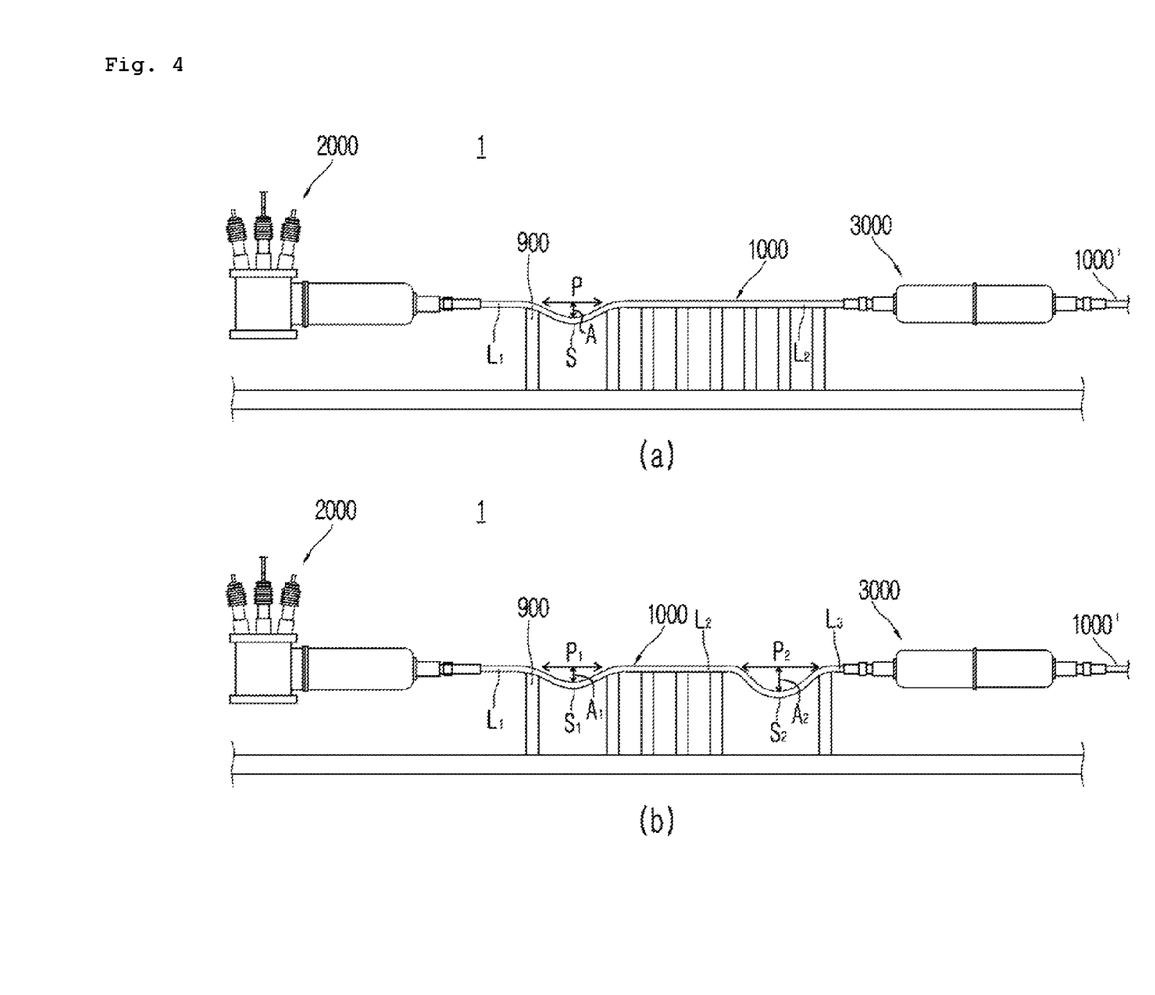
FIG. 4 illustrates two examples of a superconducting power system according to an embodiment of the present invention.

FIG. 4 illustrates two examples of a superconducting power system 1 according to an embodiment of the present invention. In detail, FIG. 4(*a*) illustrates a superconducting power system 1 having one suspension section in which a superconducting cable is suspended downward. FIG. 4(*b*) illustrates a superconducting power system 1 having two suspension sections spaced apart from each other, in which a superconducting cable is suspended downward.

The superconducting power system 1 according to an embodiment of the present invention includes a superconducting cable 1000 at a center thereof, a first connection device 2000 connected to one end of the superconducting cable, and a second connection device 3000 connected to another end of the superconducting cable. The superconducting cable 1000 includes the former 110, the inner metallic conduit 300 provided at an outer side of a cooling channel, and the outer metallic conduit 600 having the vacuum unit 500 at an inner side thereof. The superconducting power system 1 has at least one suspension section in which the superconducting cable 1000 connecting the first connection device 2000 and the second connection device 3000 is suspended downward.

The superconducting cable 1000 of FIG. 4 may include the former 110, the inner metallic conduit 300, and the outer metallic conduit 600, and have a predetermined diameter and length.

The superconducting cable 1000 may be drawn out at normal temperature, and connected to a terminal connection device connected to an electrical grid or intermediate connection devices installed at predetermined intervals.

A case in which the first connection device 2000 serving as a terminal connection device is connected to one end of the superconducting cable 1000 and the second connection device 3000 serving as an intermediate connection device is connected to another end thereof is illustrated in the embodiment of FIG. 4. However, the present invention is not limited thereto, and the superconducting power system 1 should be understood as a power system having a superconducting cable.

In the embodiment of FIG. 4(*a*), one suspension section S is provided. As described above, due to the suspension section S, a vertical displacement may be maximized to absorb a large amount of a generated axial force when the superconducting cable is cooled. Thus, the amount of a generated axial force may decrease to a greater extent than when the superconducting cable is installed in a straight line.

Two or more suspension sections S may be provided as illustrated in FIG. 4(*b*), taking the size of superconducting cable or the like into account. Furthermore, a plurality of suspension section S may be formed to be apart from each other or may be continuously formed.

Each of the two or more suspension sections S may be formed by respectively installing support members 900 on any two points on the superconducting cable such that a section between the support members 900 is suspended downward by the self-load of the superconducting cable.

Thus, as the number of suspension sections S increases, a degree to which an axial force generated in all regions of the superconducting cable is absorbed may increase.

In the superconducting power system 1 of FIG. 4(*a*), one suspension section S is provided, and a suspension length P corresponding to a period of the suspension section S and a suspension height A corresponding to a maximum deflection of the superconducting cable may be determined by the distance between the support members 900, the diameter of the superconducting cable, or the like.

As illustrated in FIG. 4(b), when the suspension lengths of different suspension sections S are different from each other, the suspension sections S may have suspension heights which are proportional to the suspension lengths thereof. Since the flexural strength of the whole superconducting cable may be in a predetermined range, the suspension lengths and heights of the suspension sections S may be determined by the distance between the support members 900.

Each of the suspension sections S may be installed in a concave form which is a one-period section and which connects adjacent two highest points among a sine or cosine function when two points on this cable are supported by the support members 900 in a state in which the cable is suspended in the horizontal direction.

The relation between the suspension length P corresponding to the period of the suspension section S and the suspension height A which is the maximum deflection of the superconducting cable in the suspension section S cannot be arbitrarily determined, and should be determined to satisfy required design conditions and sufficiently reduce an axial force caused by deformation, e.g., contraction, of the superconducting cable.

Table 1 below shows the ratio between the suspension height A and the suspension length P of a superconducting cable having a diameter D of 15 cm while changing the suspension height A and the suspension length P.

In Table 1, conditions of data cells except data cells marked with an asterisk satisfy design conditions of the superconducting power system according to an embodiment of the present invention and a condition of sufficiently decreasing an axial force.

In the superconducting power system according to an embodiment of the present invention, the required design conditions and the condition of sufficiently decreasing an axial force are satisfied only when the ratio between the suspension height A and the suspension length P of the installed superconducting cable which is the relation therebetween is in a range of 16.0 to 27.5.

The above conditions may be satisfied when the suspension section S is formed such that the suspension length P and the suspension height A are in a roughly proportional relation, and more particularly, when the ratio between the suspension length P and the suspension height A is in the range of 16.0 to 27.5.

There is a case in which an allowable axial force condition is not satisfied when any one of the suspension length P and the suspension height A of the suspension section S is increased to absorb the axial force. Experimentally, when the suspension length P of the suspension section S increases, the suspension height A should also be increased to increase an effect of absorbing the axial force, thereby satisfying the allowable axial force condition.

In detail, when the relation between the suspension height A and the diameter D of the superconducting cable is not in a range of 1.0<suspension height A/diameter D<2.0 and when the relation between the suspension length P and the diameter D of the superconducting cable is not in a range of 30<suspension length P/diameter D<40, the design conditions of the superconducting power system 1 are not satisfied or the effect of sufficiently decreasing the axial force is not achieved. Accordingly, these ranges are considered as impractical conditions and are thus excluded.

TABLE 1

| Suspension height (unit: m) | Suspension Length (unit: m) | | | |
|---|---|---|---|---|
| | 4.5 | 5.0 | 5.5 | 6.0 |
| 0.150 | 30.0 | 33.3 | 36.7 | 40.0 |
| 0.165 | 27.3 | 30.3 | 33.3 | 36.4 |
| 0.180 | 25.0 | 27.8 | 30.6 | 33.3 |
| 0.195 | 23.1 | 25.6 | 28.2 | 30.8 |
| 0.210 | 21.4 | 23.8 | 26.2 | 28.6 |
| 0.225 | 20.0 | 22.2 | 24.4 | 26.7 |
| 0.240 | 18.8 | 20.8 | 22.9 | 25.0 |
| 0.255 | 17.6 | 19.6 | 21.6 | 23.5 |
| 0.270 | 16.7 | 18.5 | 20.4 | 22.2 |
| 0.285 | 15.8 | 17.5 | 19.3 | 21.1 |
| 0.300 | 15.0 | 16.7 | 18.3 | 20.0 |

If the three relations among the diameter D, the suspension height A, and the suspension length P of the superconducting cable of the superconducting power system 1 according to an embodiment of the present invention are satisfied, the diameter D of the superconducting cable may be less than or greater than 15 cm.

The suspension section S may be formed according to the above conditions. Since the suspension section S having a vertically curved structure due to a self-load of the superconducting cable has high capability of absorbing an axial force, a terminal connection device or an intermediate connection device need not be configured to be slidable moving devices unlike in the prior art.

For example, when an allowable axial force of the terminal connection device is about five tons and a six-ton axial force is generated when the superconducting cable is installed in a straight line, the terminal connection device may be configured to be slidable so as to prevent damage to the terminal connection device. However, this method is not preferable in terms of system stability. When such a suspension section having a vertical curved structure is provided in a superconducting cable to absorb about 50 percentages of an axial force generated due to contraction of this cable, the axial force to be applied to a terminal connection box may decrease to about three tons. Due to the effect of decreasing the axial force, the stability of the whole system is guaranteed even when the terminal joint box of an allowable axial force of about five tons is configured to be a fixed type. This means that an intermediate connection device may be also configured to be a fixed type.

Thus, the first connection device 2000 and/or the second connection device 3000 of the superconducting power system according to an embodiment of the present invention may be configured to be fixed type devices.

In addition, the superconducting cable may be disposed in a horizontal straight line to form a horizontal section from the first connection device 2000/the second connection device 3000 to the support member 900 adjacent thereto. In the embodiment of FIG. 4(a), two horizontal sections L1 and L2 are located at left and right sides of the suspension section S and thus a linear state of the superconducting cable

1000 may be achieved when it is connected to the first connection device 2000 and the second connection device 3000. In the embodiment of FIG. 4(*b*), three horizontal sections L1, L2, and L3 are provided at left and right sides of suspension sections S1 and S2 and thus a linear state of the superconducting cable 1000 may be achieved when it is connected to the first connection device 2000 and the second connection device 3000.

In the embodiment of FIG. 4, a plurality of support members 900 may be densely disposed so that horizontal sections may be formed to be long in a long region of the superconducting cable 1000.

Figure 5:
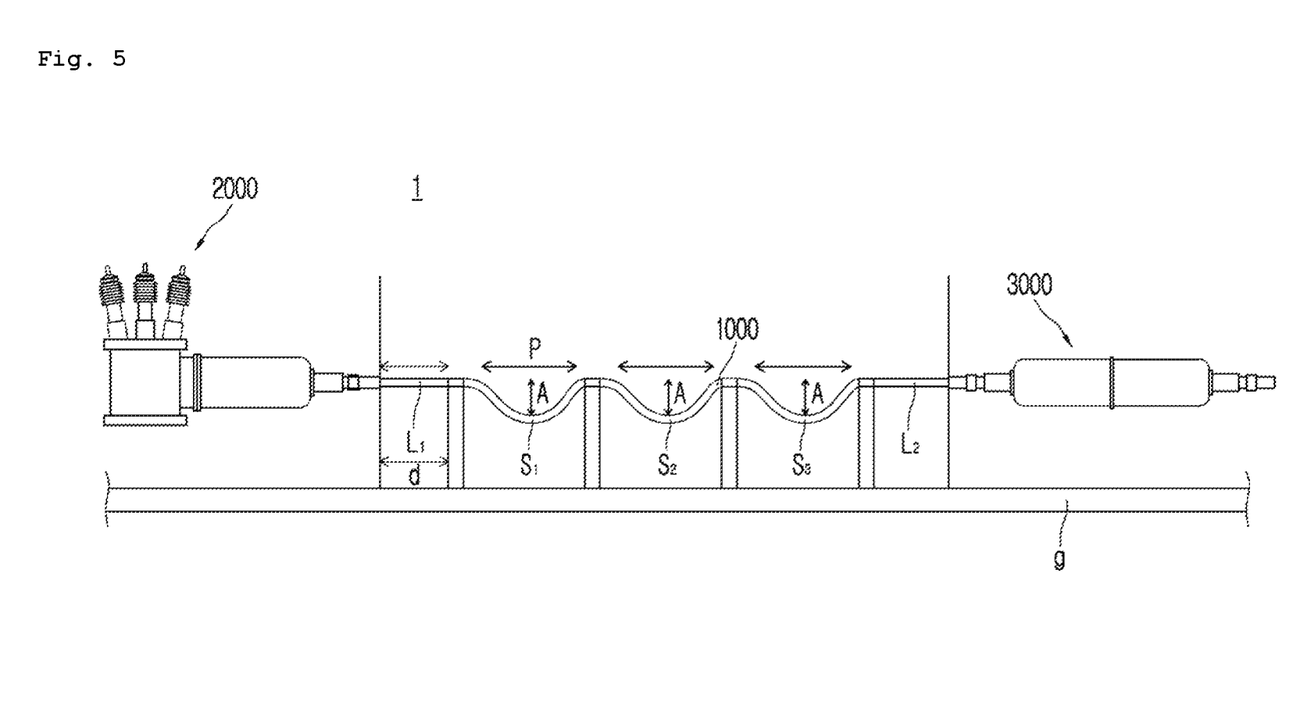
FIG. 5 is a diagram illustrating a superconducting power system according to another embodiment of the present invention.

FIG. 5 is a diagram illustrating a superconducting power system 1 according to another embodiment of the present invention. In the embodiment of FIG. 5, a plurality of suspension sections S1, S2, and S3 having the same suspension length P and the same suspension height A are consecutively disposed adjacent to each other, unlike in the embodiment of FIG. 4.

Since a region of a superconducting cable in which an axial force is generated when this cable is cooled and contracts is not a specific region, suspension sections may be formed in the whole cable, the cable may be installed in the form of a sine or cosine function which is a periodic function, and a suspension length P corresponding to a period of the periodic function and a suspension height A corresponding to an amplitude of the periodic function are set to be the same for all the suspension sections, thereby effectively distributing a degree to which an axial force is to be absorbed according to a degree of contraction of the cable.

The suspension sections need not be consecutively disposed adjacent to each other. Furthermore, the suspension lengths and heights of the suspension sections need not be set to be the same, provided that they satisfy the above ranges.

When the suspension sections are consecutively disposed adjacent to each other in the form of a periodic function, (N+1) support members 900 may be provided such that N suspension sections are consecutively disposed adjacent to each other. Here, 'N' denotes a natural number which is greater than or equal to '2'. In the embodiment of FIG. 5, three suspension sections are provided and the superconducting cable is supported by four support members 900.

Figure 6:
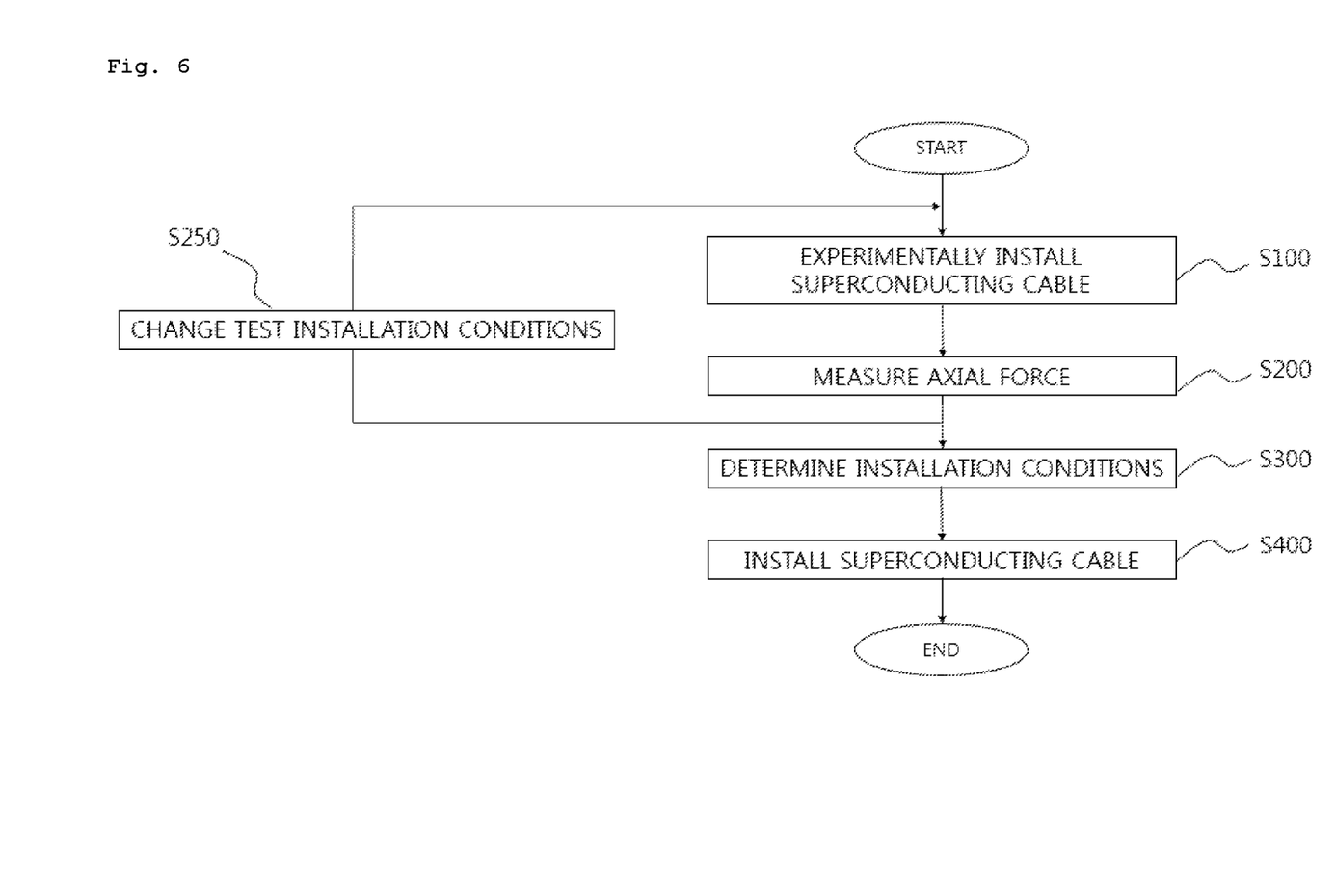
FIG. 6 is a flowchart of a method of installing a superconducting cable according to an embodiment of the present invention.

FIG. 6 is a flowchart of a method of installing a superconducting cable according to an embodiment of the present invention.

In the method of installing a superconducting cable according to an embodiment of the present invention, a superconducting cable including a core unit 100, an inner metallic conduit 300, and an outer metallic conduit 600 is installed by connecting it to two fixed connection devices. The core unit 100 includes a former 110 formed of a copper material and a superconducting conductor layer at a center thereof. The inner metallic conduit 300 includes a cooling unit for cooling the core unit 100 at an inner side thereof. The outer metallic conduit 600 accommodates an insulating unit and a vacuum unit outside the inner metallic conduit 300. The method may include experimentally installing the superconducting cable in a periodic function such that a plurality of suspension sections in which the superconducting cable is suspended downward are disposed adjacent to each other, the suspension sections having the same suspension length and the same suspension height (operation S100); measuring axial forces of the former 110, the inner metallic conduit 300 and the outer metallic conduit 600 caused by the expansion or contraction thereof in a lengthwise direction of the superconducting cable experimentally installed in operation S100, when this cable is cooled (operation S200); determining installation conditions for installing the superconducting cable, taking into account the sum of the axial forces of the former 110, the inner metallic conduit 300, and the outer metallic conduit 600 measured in operation S200, the installation conditions including a suspension length and height of each of the plurality of suspension sections (operation S300); and installing the superconducting cable according to the installation conditions determined in operation S300 (operation S400).

For convenience of explanation, a case in which a superconducting cable is installed in the form of a periodic function as illustrated in FIG. 5 will be described below.

During the installation of the superconducting cable, the diameter of the superconducting cable, required suspension lengths of suspension sections, and the like should be considered to more effectively absorb an axial force.

In particular, as described above, when a maximum allowable axial force of a connection device, the length of the superconducting cable, etc. are considered to determine the installation conditions, they may be important standards of judgement.

The length of the superconducting cable as an installation condition is an important factor, because a length of a superconducting cable required to connect the same straight-line distance varies according to the number and length/height of the suspension sections and costs depend on the length of the required superconducting cable which is a high-price cable.

The experimentally installing of the superconducting cable (operation S100), the measuring of the axial forces (operation S200) and the determining of the installation conditions (operation S300) may be sequentially performed, so that the superconducting cable may be first experimentally installed according to a designed suspension length or height thereof and an axial force may be then measured to determine whether installation conditions are satisfied.

A diameter of a superconducting cable depends on the amount of power to be transferred. Thus, if an actual installation distance of the superconducting cable is long, optimum installation conditions should be determined taking into account an allowable axial force or a length of the superconducting cable to be used when the superconducting cable is experimentally installed in a periodic function by determining a test section of the superconducting cable beforehand.

In the experimentally installing of the superconducting cable (operation S100), installation variables to be considered include a suspension length and height of each suspension section in the case of a superconducting cable having a diameter of D.

Thus, the experimentally installing of the superconducting cable (operation S100) and the measuring of the axial force (operation S200) may be repeatedly performed a plurality of times while changing a suspension length and height of the superconducting cable to be experimentally installed.

When an axial force is measured in various combinations of test conditions while changing the test conditions, database of measured axial forces may be obtained. Thus, the determining of the installation conditions (operation S300) may be performed by comparing the sum of the axial forces of the former 110, the inner metallic conduit 300, and the outer metallic conduit 600 of the superconducting cable measured in operation S200 and the length of the installed superconducting cable with a maximum allowable axial force and cost conditions (e.g., the length of the superconducting cable, etc.).

In this case, the determined installation conditions may include several combinations of a suspension length and height of each suspension section in the form of a periodic function or a range thereof.

That is, in the determining of the installation conditions (operation S300), a plurality of allowable installation conditions or a range of suspension length/height may be determined rather than determining only the suspension length and height as installation conditions.

As described above, the determining of the installation conditions (operation S300) may be performed by comparing the sum of the axial forces of the former 110, the inner metallic conduit 300, and the outer metallic conduit 600 of the superconducting cable measured in operation S200 and the length of the installed superconducting cable with the maximum allowable axial force and the cost conditions, such that the relation between the suspension length and the suspension height satisfies a range of 16<suspension length/suspension height<27.5.

In this case, the determining of the installation conditions (operation S300) may be performed such that the relation between the suspension length corresponding to a period of each suspension section and the diameter D of the superconducting cable satisfies a range of 30<suspension length/diameter<40 or the relation between the suspension height and the diameter D of the superconducting cable satisfies a range of 1.0<suspension height/diameter D<2.0.

In addition, when experimental data of each of the former 110, the inner metallic conduit 300, and the outer metallic conduit 600 is obtained, the experimentally installing of the superconducting cable (operation S100) and the measuring of the axial force (operation S200) may be performed according to a computer simulation method.

In a superconducting power system and a superconducting cable installation method according to an embodiment of the present invention, an axial force generated due to the contraction of a superconducting cable when the superconducting cable is cooled may be effectively absorbed. Thus, an axial force to be applied to a terminal connection device and the like may be effectively decreased.

Furthermore, in the superconducting power system and the superconducting cable installation method according to an embodiment of the present invention, an axial force to be applied to a terminal connection device and the like may be effectively absorbed. Accordingly, the terminal connection device and the like may be configured to be fixed devices rather than mobile devices, thereby improving the stability of the whole system.

In addition, in the superconducting power system and the superconducting cable installation method according to an embodiment of the present invention, unnecessary waste of an installation space (e.g., an offset space) may be minimized.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A superconducting power system comprising:
    a superconducting cable including a former at a center thereof, an inner metallic conduit at an outer side of a cooling channel, and an outer metallic conduit having a vacuum unit at an inner side thereof;
    a first connection device connected to one end of the superconducting cable; and
    a second connection device connected to another end of the superconducting cable,
    wherein at least one suspension section is provided, in which the superconducting cable connecting the first and second connection devices is suspended downward,
    wherein a suspension length corresponding to a period of each of the at least one suspension section and a suspension height corresponding to a maximum deflection of the superconducting cable in each of the at least one suspension section satisfy a range of 16.0<suspension length/suspension height<27.5.

2. The superconducting power system of claim 1, wherein the at least one suspension section has a form of a one-period section connecting adjacent highest points among a sine function and a cosine function.

3. The superconducting power system of claim 1, wherein the suspension height and a diameter of the superconducting cable satisfy a range of 1.0<suspension height/diameter<2.0.

4. The superconducting power system of claim 1, wherein the suspension length and a diameter of the superconducting cable satisfy a range of 30<suspension length/diameter<40.

5. The superconducting power system of claim 1, further comprising at least two support members provided at locations spaced apart from each other to support the superconducting cable so as to form the at least one suspension section.

6. The superconducting power system of claim 2, further comprising (N+1) support members such that N suspension sections are consecutively disposed adjacent to each other, where N denotes a natural number which is greater than and equal to 2.

7. The superconducting power system of claim 6, wherein a suspension section having a longer suspension length is greater in height than a suspension section having a shorter suspension length among the N suspension sections.

8. The superconducting power system of claim 1, wherein the first or second connection device is configured to be a fixed device.

9. The superconducting power system of claim 5, wherein the superconducting cable is disposed in a horizontal straight line to form a horizontal section from each of the first and second connection device to a support member adjacent thereto.

10. A method of installing a superconducting cable by connecting the superconducting cable to two fixed connection devices, the superconducting cable including a core unit having a former formed of a copper material and a superconducting conductor layer at a center thereof, an inner metallic conduit having a cooling unit for cooling the core unit at an inner side thereof, and an outer metallic conduit accommodating an insulating unit and a vacuum unit outside the inner metallic conduit, the method comprising:
    experimentally installing the superconducting cable in the form of a periodic function such that a plurality of suspension sections in which the superconducting cable is suspended downward are disposed adjacent to each other, the plurality of suspension sections having the same suspension length and the same suspension height;
    measuring axial forces of the former, the inner metallic conduit, and the outer metallic conduit due to expansion or contraction thereof in a lengthwise direction of the superconducting cable, which is installed in the experimentally installing of the superconducting cable, when the superconducting cable is cooled;

determining installation conditions for installing the superconducting cable, taking into account the sum of the axial forces of the former, the inner metallic conduit, and the outer metallic conduit measured in the measuring of the axial forces, wherein the installation conditions comprise a suspension length corresponding to the distance between the plurality of suspension sections in a horizontal direction and a suspension height of the plurality of suspension sections; and installing the superconducting cable according to the installation conditions determined in the determining of the installation conditions, wherein the determining of the installation conditions is performed by comparing the sum of the axial forces of the former, the inner metallic conduit, and the outer metallic conduit measured in the measuring of the axial forces and a length of the superconducting cable to be installed with a maximum allowable axial force and cost conditions, such that the suspension length and the suspension height satisfy a range of 16<suspension length/suspension height<27.5.

11. The method of claim 10, wherein the determining of the installation conditions is performed such that a relation between the suspension length corresponding to a period of each of the plurality of suspension sections and a diameter of the superconducting cable satisfies a range of 30<suspension length/diameter<40.

12. The method of claim 10, wherein the determining of the installation conditions is performed such that a relation between the suspension height and a diameter of the superconducting cable satisfies a range of 1.0<suspension height/diameter<2.0.

13. The method of claim 10, wherein the determining of the installation conditions comprises determining a plurality of allowable installation conditions.

14. The method of claim 10, wherein the experimentally installing of the semiconducting cable and the measuring of the axial forces are repeatedly performed a plurality of times while changing the suspension length and height of the experimentally installed superconducting cable.

15. The method of claim 10, wherein the experimentally installing of the superconducting cable and the measuring of the axial forces are performed according to a computer simulation method.

\* \* \* \* \*